UNITED STATES PATENT OFFICE.

MELCHIOR BOENIGER, OF BASEL, SWITZERLAND, ASSIGNOR TO CHEMICAL WORKS FORMERLY SANDOZ, OF BASEL, SWITZERLAND.

MANUFACTURE OF CHROMABLE SECONDARY O-OXY DISAZO DYESTUFFS.

1,199,233. Specification of Letters Patent. Patented Sept. 26, 1916.

No Drawing. Application filed January 29, 1916. Serial No. 75,031.

*To all whom it may concern:*

Be it known that I, MELCHIOR BOENIGER, a citizen of the Swiss Republic, residing at Basel, Switzerland, have invented certain new and useful Improvements in the Manufacture of Chromable Secondary O-Oxy Disazo Dyestuffs, of which the following is a specification.

It has previously been mentioned in the specification of British Patent No. 14768 of 1903 that secondary disazo dyestuffs with 1.8-aminonaphthol-3-6-disulfonic acid in the middle position are rendered faster to washing and milling by subsequent chroming. Dyeings thus treated cannot however fully satisfy requirements in regard to severe milling and especially as regards fastness to the potting process.

Now I have found that secondary chromable o-oxy disazo dyestuffs of excellent fastness to milling and potting can be obtained if monoazo dyestuffs from o-diazo phenols and 1.8-aminonaphthol-3.6-disulfonic acid are further diazotized and combined with pyrazolones having its 4 position unoccupied. Whereas according to experience hitherto the secondary o-oxydisazo dye-stuffs have proved to be in almost every case less fast than the monoazo derivatives (see P. Friedländer, *Fortschritte der Teerfarbenfabrikation*, part 8, page 544), and on the other hand disazo dyestuffs with pyrazolone derivatives in end position have not been able to find adoption in the dyeing industry owing to their unsatisfactory degree of fastness to light, the chromed green dyeings of the disazo dyestuffs obtained according to the o-diazophenol-1-8-aminonaphthol-3.6-disulfonic-acid-pyrazolone scheme of the present invention are distinguished not only by excellent fastness to milling and potting but also by very good fastness to light. In the latter property they show a valuable advance as compared with individual monoazo dyestuffs from o-diazophenols and H-acid which have previously been introduced as green after-chrome dyes.

In order to illustrate the new process more fully the following examples are given, the parts being by weight:

I. The azo dyestuff obtained from 19.9 parts diazotized picramic acid and 34.1 parts 1.8-aminonaphthol-3.6-disulfonic acid (acid sodium salt) by alkaline combination, is diazotized with 7 parts of nitrate and the diazo compound is coupled with the soda-alkaline solution of 25.4 parts of 1-p-sulfophenyl-3-methyl-5-pyrazolone. The disazo dyestuff separates out directly as a black precipitate which can be at once filtered off and dried. It dyes in an acid bath unmordanted wool in greenish-black shades which by subsequent chroming change into a dark green fast to washing and potting and of excellent fastness to light.

II. 22.4 parts of p-chlor-o-aminophenol sulfonic acid $(OH:NH_2:Cl:SO_3H:=1:2:4:6)$ are diazotized with 7 parts of nitrite and combined in soda alkaline solution with 34.1 parts of 1.8-aminonaphthol-3.6-disulfonic acid (acid sodium salt) to the monoazo dyestuff, the deep blue solution of which can at once be acidified and converted with 7 parts of nitrite into the diazo compound which separates out yellow brown. By coupling with an alkaline solution of 17.4 parts of 1-phenyl-3-methyl-5-pyrazolone the disazo dyestuff is obtained which at once separates out as a blue black precipitate.

It gives on unmordanted wool by subsequent chroming dyeings of excellent fastness to light, milling and potting, the direct dyeings on unmordanted wool being brownish blue-red, changing on subsequent chroming to milling and potting fast-green.

Dyestuffs or similar properties can be obtained in general by employment of monoazo dyestuffs from diazotized o-aminophenols, their nitro and halogen derivatives, and their sulfonic acids, and 1.8-amino-3.6-disulfonic acid. As pyrazolones in the end position all pyrazolones having an unoccupied 4 position may be employed,—thus 1-aryl-3-methyl-5-pyrazolones, 1-aryl-5-pyrazolones-3-carboxylic acids, their derivatives and substitution products.

In a general rule the dyestuffs thus obtained yield upon reduction with stannous chlorid and hydrochloric acid an o-aminophenol compound, 1.7-diamino-8-naphthol-3.6-disulfonic acid and a 4-amino-5-pyrazolone compound.

What I claim and desire to secure by Letters Patent is:—

1. Process for the manufacture of chromable secondary o-oxy disazo dyestuffs by further diazotizing a monoazo dyestuff obtained in alkaline combination from a disazo-o-phenol and 1.8-aminonaphthol-3.6-disulfonic acid, and coupling the diazotized body with a pyrazolone having its 4 position unoccupied.

2. Process for the manufacture of chromable secondary disazo dyestuffs, by further diazotizing the monoazo dyestuff obtained in alkaline combination from a nitro-o-diazophenol and 1.8-aminonaphthol-3.6-disulfonic acid, and coupling the resulting body with a pyrazolone having its 4 position unoccupied.

3. Process for the manufacture of chromable secondary disazo dyestuffs, by further diazotizing the monoazo dyestuff obtained in alkaline combination from diazotized picramic acid and 1.8-aminonaphthol-3.6-disulfonic acid, and coupling the resulting body with a pyrazolone having its 4 position unoccupied.

4. Process for the manufacture of chromable secondary disazo dyestuffs, by further diazotizing the monoazo dyestuff obtained in alkaline combination from diazotized picramic acid and 1.8-aminonaphthol-3.6-disulfonic acid, and coupling the resulting body with 1-p-sulfophenyl-3-methyl-5-pyrazolone.

5. The new secondary o-oxydisazo dyestuffs being derived from pyrazolones of unoccupied 4 position and a diazotized monoazo dyestuff, obtained by alkaline combination of an o-diazophenol with 1.8-aminonaphthol-3.6-disulfonic acid, giving by subsequent chroming of their dyeings green shades fast to milling and potting, yielding upon reduction with stannous chlorid and hydrochloric acid an o-aminophenol compound, 1.7-diamino-8-naphthol-3.6-disulfonic acid and a 4-amino-pyrazolone compound.

6. The new secondary o-oxydisazo dyestuffs being derived from pyrazolones of unoccupied 4 position and a diazotized monoazo dyestuff obtained by alkaline combination of a nitro o-diazophenol compound with 1.8-aminonaphthol-3.6-disulfonic acid, giving by subsequent chroming of their dyeings green shades fast to milling and potting, yielding upon reduction with stannous chlorid and hydrochloric acid an amino o-aminophenol compound, 1.7-diamino-8-naphthol-3.6-disulfonic acid and a 4-amino-5-pyrazolone compound.

7. The new secondary o-oxydisazo dyestuffs being derived from pyrazolones of unoccupied 4 position and a diazotized monoazo dyestuff obtained by alkaline combination of diazotized picramic acid with 1.8-aminonaphthol-3.6-disulfonic acid, giving by subsequent chroming of their dyeings green shades fast to milling and potting, yielding upon reduction with stannous chlorid and hydrochloric acid 2.4.6-triamino-1-phenol, 1.7-diamino-8-naphthol-3.6-disulfonic acid and a 4-amino-5-pyrazolone compound.

8. The new secondary o-oxydisazo dyestuffs being derived from 1-p-sulfophenyl-3-methyl-5-pyrazolone and a diazotized monoazo dyestuff obtained by alkaline combination of diazotized picramic acid with 1.8-aminonaphthol-3.6-disulfonic acid, giving by subsequent chroming of its dyeings green shades fast to milling and potting, yielding upon reduction with stannous chlorid and hydrochloric acid 2.4.6-triaminophenol 1.7-diamino-8-naphthol-3.6-disulfonic acid and 1-p-sulfophenyl-3-methyl-4-amino-5-pyrazolone.

In witness whereof, I have hereunto signed my name in the presence of two subscribing witnesses.

MELCHIOR BOENIGER.

Witnesses:
WERNER STAUFFACHER,
ARNOLD STEINER.